UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

MANUFACTURE OF CRYSTALLINE FUSED ALUMINA.

1,239,984. Specification of Letters Patent. Patented Sept. 11, 1917.

No Drawing. Application filed February 26, 1916. Serial No. 80,668.

*To all whom it may concern:*

Be it known that I, FRANK J. TONE, a citizen of the United States, residing at Niagara Falls, in the county of Niagara and State of New York, have invented a new and useful Improvement in the Manufacture of Crystalline Fused Alumina, of which the following is a full, clear, and exact description.

This invention relates to the treatment of ores containing alumina and alkali, and particularly refers to the recovery of the alumina in fused crystalline form and the alkali in the form of soluble compounds. As a typical example I take the mineral alunite having the following chemical formula:

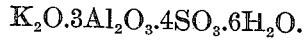

$$K_2O.3Al_2O_3.4SO_3.6H_2O.$$

The commercial ore generally contains silica, iron oxid, and other impurities. This ore is dried and crushed to about one-half inch and finer. Then the material, with or without calcining, is charged into an electric arc furnace of the depending electrode type, preferably of the form shown in United States Patent No. 929,517, issued to F. J. Tone, July 27, 1909, and subjected therein to a temperature of 2100° C. and upward, sufficient to drive off the water and sulfur dioxid, to volatilize the potassium compound, and to fuse the alumina. The furnace is provided with a hood and with an exit pipe through which the fumes and gases are withdrawn and passed through a suitable settling system, bag house, or an electrical precipitation process. These fumes carry with the volatilized potassium compounds some volatilized alumina and some silica occurring as impurities in the ore. The precipitated product is then leached or otherwise treated to recover the potassium compounds. The sulfur gases are allowed to escape or they may be used for the manufacture of sulfuric acid by any process known in the art. The fused alumina is cooled and treated in the usual manner.

My process has the advantage that a complete separation is made between the alumina and the potash due to the high temperature obtained by the electric furnace. The fused alumina contains only a trace of potash and the complete recovery of potash is impossible with other furnace methods employing lower temperature, especially if, as is most generally the case, the commercial ores contain silica. Double silicates of potassium and aluminum are then present or are formed in the process of furnacing, and potash so combined is difficult to drive off except in the electric furnace.

Instead of charging the crude alunite directly into the electric furnace the ore may first be subjected to a separate calcining in a reverberatory furnace to drive off the water and a portion of the sulfur dioxid.

The crystalline alumina made by my process is of great hardness and when crushed into grain form the grains possess great sharpness and abrasive power and are highly adapted for the manufacture of abrasive wheels. The product is also useful for refractory purposes and for various chemical and metallurgical purposes for which alumina is used.

To possess the best abrasive properties crystalline fused alumina should have an alumina content of from 95% to 99%, and should the silica and iron oxid present in the ore be excessive and so cause an excessive amount of impurities in the alumina, they may be eliminated during the process of fusion by reducing them to ferro-silicon by any well known method. This ferro-silicon should preferably contain not to exceed 15% to 20% silicon and if insufficient iron is present in the ore, additional iron should be added.

My process may be applied to other ores of aluminum containing potassium or other alkali compounds in which the alkali is present in substantial amounts.

I claim:

1. The process of making crystalline fused alumina which consists in subjecting ores containing alumina and alkali compounds in which the alkali is present in substantial amounts to electric heat sufficient to volatilize the alkali compound and to fuse the alumina, collecting and condensing the alkali compound, and allowing the fused alumina to cool.

2. The process of making crystalline fused alumina which consists in subjecting ores containing alumina and potassium compounds in which the alkali is present in substantial amounts to electric heat sufficient to volatilize the potassium compounds and to fuse the alumina, collecting and condensing the potassium compounds, and allowing the fused alumina to cool.

3. The process of making crystalline fused alumina which consists in subjecting alunite to electric heat sufficient to drive off the water and sulfur compounds, volatilize the potassium compounds, and fuse the alumina, condensing and collecting the potassium compounds, and allowing the fused alumina to cool.

4. In the manufacture of crystalline fused alumina, the method which consists in subjecting ores containing alumina and alkali compounds in which the alkali is present in substantial amounts to a temperature in excess of 2000° C. to volatilize the alkali compound, and to fuse the alumina, passing off the fumes and gases, and allowing the fused alumina to cool.

5. In the manufacture of crystalline fused alumina, the method which consists in subjecting ores containing alumina and alkali compounds in which the alkali is present in substantial amounts to a temperature in excess of 2000° C. to volatilize the alkali compound, and to fuse the alumina, passing off the fumes and gases and recovering the alkali metal therefrom, and allowing the fused alumina to cool.

6. In the manufacture of crystalline fused alumina, the method which consists in subjecting ore containing alumina and alkali compounds in which the alkali is present in substantial amounts to electric heat sufficient to volatilize the alkali compound and to fuse the alumina, reducing any excess of silica and iron oxid in the ore to ferro-silicon, and separately recovering the fused alumina and the alkali metal.

7. The herein described process of treating ores containing alumina and alkali compounds in which the alkali is present in substantial amounts, which consists in subjecting the ores to electric heat sufficient to volatilize the alkali compound and to fuse the alumina, passing the fumes containing the alkali off from the furnace and recovering the alkali therefrom, and allowing the fused alumina to cool.

8. The process of treating ores containing alumina and alkali compounds in which the alkali is present in substantial amounts, which consists in subjecting them to electric heat sufficient to drive off the water and sulfur contained in the ores, and to volatilize the alkali compound and to fuse the alumina, passing off the fumes carrying the volatilized alkali compound, recovering the alkali therefrom, and allowing the fused alumina to cool.

9. The treatment of ores containing alumina and alkali compounds, which consists in subjecting them to electric heat sufficient to volatilize the alkali compound and to fuse the alumina, recovering the alkali from the volatilization fumes, allowing the fused alumina to cool, and during the treatment eliminating the silica and iron oxid present in the ore.

In testimony whereof, I have hereunto set my hand.

FRANK J. TONE.

Witnesses:
SAMUEL S. DIEMER,
C. H. GREENWOOD.